(12) United States Patent
Ueda et al.

(10) Patent No.: US 10,294,362 B2
(45) Date of Patent: May 21, 2019

(54) RESIN COMPOSITION AND MOLDED ARTICLE

(71) Applicant: DAIKIN INDUSTRIES, LTD., Osaka-shi, Osaka (JP)

(72) Inventors: Yuki Ueda, Settsu (JP); Masami Nishiumi, Settsu (JP); Haruhisa Masuda, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/415,381

(22) PCT Filed: Jul. 23, 2013

(86) PCT No.: PCT/JP2013/069865
§ 371 (c)(1),
(2) Date: Jan. 16, 2015

(87) PCT Pub. No.: WO2014/024671
PCT Pub. Date: Feb. 13, 2014

(65) Prior Publication Data
US 2015/0203679 A1    Jul. 23, 2015

(30) Foreign Application Priority Data

Aug. 6, 2012 (JP) ................. 2012-174372

(51) Int. Cl.
| | | |
|---|---|---|
| C08L 61/16 | (2006.01) | |
| C08L 27/18 | (2006.01) | |
| H01B 3/30 | (2006.01) | |
| H01B 3/36 | (2006.01) | |
| H01B 3/44 | (2006.01) | |
| C08L 71/00 | (2006.01) | |
| H01B 3/42 | (2006.01) | |

(52) U.S. Cl.
CPC .............. *C08L 61/16* (2013.01); *C08L 27/18* (2013.01); *C08L 71/00* (2013.01); *H01B 3/307* (2013.01); *H01B 3/308* (2013.01); *H01B 3/36* (2013.01); *H01B 3/427* (2013.01); *H01B 3/445* (2013.01); *C08G 2650/40* (2013.01); *C08L 2201/02* (2013.01); *C08L 2203/202* (2013.01); *Y10T 428/31544* (2015.04)

(58) Field of Classification Search
None
See application file for complete search history.

(56) References Cited

U.S. PATENT DOCUMENTS

| | | | | | |
|---|---|---|---|---|---|
| 4,001,351 | A | * | 1/1977 | Roura ................ | C08J 3/005 525/197 |
| 4,546,141 | A | * | 10/1985 | Gebauer ................ | C08K 3/22 427/409 |
| 5,789,508 | A | * | 8/1998 | Baker ................ | C08F 14/26 526/225 |
| 6,177,518 | B1 | * | 1/2001 | Lahijani ................ | C08L 27/12 264/171.27 |
| 2004/0082701 | A1 | | 4/2004 | Ota et al. | |
| 2004/0102572 | A1 | | 5/2004 | Kubo et al. | |
| 2012/0061119 | A1 | | 3/2012 | Schlipf et al. | |
| 2013/0109810 | A1 | * | 5/2013 | Xie ................ | C08L 27/18 525/153 |
| 2014/0329087 | A1 | | 11/2014 | Masuda et al. | |
| 2014/0329968 | A1 | | 11/2014 | Masuda et al. | |

FOREIGN PATENT DOCUMENTS

| | | |
|---|---|---|
| CN | 103958608 A | 7/2014 |
| CN | 103999167 A | 8/2014 |
| JP | 2-212539 A | 8/1990 |
| JP | 6-316686 A | 11/1994 |
| JP | 63-16686 A | 11/1994 |
| JP | 8-48887 A | 2/1996 |
| JP | 9-87517 A | 3/1997 |
| JP | 10-195302 A | 7/1998 |
| JP | 11-158340 A | 6/1999 |
| JP | 2001-49068 A | 2/2001 |
| JP | 2001-55478 A | 2/2001 |
| JP | 2002-146202 A | 5/2002 |
| JP | 2002-235011 A | 8/2002 |
| JP | 2003-82123 A | 3/2003 |
| JP | 2004-137363 A | 5/2004 |
| JP | 2006-274073 A | 10/2006 |
| JP | 2010-189599 A | 9/2010 |
| WO | 03/044093 A1 | 5/2003 |
| WO | 2010/105990 A1 | 9/2010 |
| WO | 2012/005133 A1 | 1/2012 |
| WO | 2013/088964 A1 | 6/2013 |
| WO | 2013/088965 A1 | 6/2013 |
| WO | 2013/088966 A1 | 6/2013 |
| WO | 2013/088967 A1 | 6/2013 |
| WO | 2013/088968 A1 | 6/2013 |

OTHER PUBLICATIONS

Engineering Toolbox, Absolute, Dynamic and Kinematic Viscosity, retrieved Dec. 10, 2016, pp. 1-8, http://www.engineeringtoolbox.com/dynamic-absolute-kinematic-viscosity-d_412.html.*
Griff et al., Melt Index Mysteries Unmasked, Film Lines, 2003, p. 1, http://www.griffex.com/Griff-meltindex.pdf (Year: 2003).*
International Search Report of PCT/JP2013/069865, dated Oct. 8, 2013. [PCT/ISA/210].

(Continued)

*Primary Examiner* — Callie E Shosho
*Assistant Examiner* — Patrick N English
(74) *Attorney, Agent, or Firm* — Sughrue Mion, PLLC

(57) ABSTRACT

The present invention aims to provide a resin composition capable of providing a molded article which is excellent in flexibility, acid resistance, and electrical properties. The resin composition of the present invention includes: an aromatic polyether ketone resin (I); and a fluororesin (II), the fluororesin (II) being a copolymer of tetrafluoroethylene and a perfluoroethylenic unsaturated compound represented by the following formula (1): $CF_2=CF-Rf^1$ (1) wherein $Rf^1$ represents $-CF_3$ or $-ORf^2$, and $Rf^2$ represents a $C_1$-$C_5$ perfluoroalkyl group, the fluororesin (II) being dispersed as particles in the aromatic polyether ketone resin (I), the resin composition satisfying a ratio (I):(II) by mass between the aromatic polyether ketone resin (I) and the fluororesin (II) of 50:50 to 10:90.

6 Claims, No Drawings

(56) References Cited

OTHER PUBLICATIONS

International Preliminary Report on Patentability dated Feb. 10, 2015, issued by the International Bureau in corresponding International Application No. PCT/JP2013/069865.
Achim Frick et al., "Properties of Melt Processable PTFE/PEEK Blends: The Effect of Reactive Compatibilization Using Electron Beam Irradiated Melt Processable PTFE", Journal of Applied Polymer Science, 2013, pp. 1815-1827. DOI: 10.1002/APP.38337.
Communication dated Jul. 6, 2015 from the European Patent Office in counterpart application No. 13827082.2.

* cited by examiner

RESIN COMPOSITION AND MOLDED ARTICLE

CROSS REFERENCE TO RELATED APPLICATIONS

This application is a National Stage of International Application No. PCT/JP2013/069865 filed Jul. 23, 2013, claiming priority based on Japanese Patent Application No. 2012-174372, filed Aug. 6, 2012, the contents of all of which are incorporated herein by reference in their entirety.

TECHNICAL FIELD

The present invention relates to a resin composition and a molded article.

BACKGROUND ART

Switching from metal components to resin components has recently been actively studied for the purposes of weight saving and cost reduction. The studies have led to practical use of vehicle components, industrial components, and electrical and electronic components formed from a thermoplastic resin, such as a polyamide resin, a polycarbonate resin, and a polyacetal resin. Also for use as sliding parts including gears and bearing retainers, replacement of metal sliding parts to resin sliding parts is currently in progress. Thermoplastic resins, however, are insufficient in wear properties or wear resistance properties, as the sliding parts are used under such conditions as a high load, a high temperature, and a high rotation speed. Thus, thermoplastic resins unfortunately may cause problems such as wear, fusion, cracking, and chipping.

Meanwhile, fluororesins are excellent in wear properties or wear resistance properties, heat resistance, chemical resistance, solvent resistance, weather resistance, flexibility, electrical properties, and other properties, and are thus used in various fields including cars, industrial machines, OA equipment, and electrical and electronic equipment. In particular, fluororesins have excellent wear properties or wear resistance properties, and are one of the resins having a notably low frictional coefficient. Many fluororesins, however, have inferior mechanical properties and physical heat resistance represented by, for example, deflection temperature under load compared to crystalline heat-resistant thermoplastic resins. Also, some fluororesins have inferior dimensional stability compared to amorphous heat-resistant thermoplastic resins. Hence, applications of fluororesins have been limited.

Under the above-mentioned circumstances, thermoplastic resins have been studied for the purpose of improving their wear properties or wear resistance properties and applying them to sliding parts in wider fields. For example, Patent Literature 1 discloses a resin composition containing 1 to 50 parts by weight in total of a fluororesin and graphite for each 100 parts by weight of a resin composition that consists of 60 to 99 parts by weight of a thermoplastic resin having a heat deformation temperature of 100° C. or higher and 40 to 1 part by weight of carbon fibers. Patent Literature 2 discloses a resin composition that contains a thermoplastic heat-resistant resin (A) having a molding temperature of 300° C. or higher, and a polymer (B) obtained by polymerization of fluoroacryl α-fluoroacrylate that has a specific structure as an essential component. Patent Literature 3 proposes a resin composition containing 70 to 99% by mass of a polyaryl ketone resin (A) and 30 to 1% by mass of a fluororesin (B), wherein the fluororesin (B) dispersed in the resin composition has an average particle size of 0.1 to 30 μm.

Patent Literature 4 proposes a resin composition containing a resin (component (A)) other than fluororesin and a fluororesin (component (B)). The resin composition has a sea-island structure where the fluororesin (component (B)), which constitutes the island phase, is dispersed in the resin (component (A)) other than fluororesin, which constitutes the sea phase, and also the island-phase fluororesin (component (B)) has an average particle size of 200 μm or smaller. Patent Literature 5 proposes a polyimide resin composition that substantially contains 1 to 40 parts by weight of a fluororesin having a melt flow index at 400° C. and 10 kg of 4.0 to 15.0 g/10 min for each 100 parts by weight in total of a resin composition consisting of a polyimide resin (40 to 95 parts by weight) having a specific repeating unit and a polyallyl ether ketone (60 to 5 parts by weight). Patent Literature 6 proposes a resin composition including an aromatic polyether ketone resin (I) and a fluororesin (II), wherein the fluororesin (II) is a copolymer of tetrafluoroethylene and a specific perfluoroethylenic unsaturated compound; the resin composition satisfies a ratio (I):(II) by mass between the aromatic polyether ketone resin (I) and the fluororesin (II) of 95:5 to 50:50; the fluororesin (II) is dispersed as particles in the aromatic polyether ketone resin (I); and the fluororesin (II) has an average dispersed particle size of 3.0 μm or smaller. Patent Literature 7 proposes a modified engineering plastic formed by cross-linking a mixture of an engineering plastic and a fluororesin. Patent Literature 8 proposes a thermoplastic resin composition containing 5 to 40 parts by mass of a fluororesin and 95 to 60 parts by mass of another thermoplastic resin, wherein at least part of the carbon atoms constituting the fluororesin molecular chain has a cross-linking structure with other carbon atoms constituting the molecular chain; and at least part of the fluororesin molecules has an active terminus.

Fluororesins are also known to be added to a thermoplastic resin for purposes other than enhancement of the wear properties or wear resistance properties. For example, Patent Literature 9 discloses a technique of improving the mold-processability, including decreasing the extrusion pressure and extrusion torque, in the mold-processing of engineering plastics. The technique includes adding 0.005 to 1% by mass of a fluoropolymer based on the total mass of the engineering plastics and the fluoropolymer. Patent Literature 10 discloses a technique of mixing PEEK resin fine powder in an aqueous dispersion of a PFA resin at a PFA:PEEK ratio by weight of 75:25 to 70:30, directly applying the resulting dispersion to a roughened metal surface in accordance with common methods, and baking the resulting product, so that a PFA-PEEK composite coating film having adhesion durability is formed. Patent Literature 11 discloses a thermoplastic resin composition containing a mixture of polyaryl ketone resin and thermoplastic fluororesin, wherein the thermoplastic fluororesin constitutes a continuous phase of the mixture and the polyaryl ketone resin constitutes a dispersion phase thereof. Patent Literature 12 proposes a polyaryl ketone film as a material for providing a film having a high Young's modulus, low dielectric constant, excellent flame retardancy, heat resistance, and insulation properties, and high rigidity, and a FPC including this film as the substrate thereof. The polyaryl ketone film includes a resin composition containing polyaryl ketone and another thermoplastic resin in an amount of 3 to 30 parts by weight for each 100 parts by weight of the polyaryl ketone. The film has a cushion rate of 3 to 30% and is stretched in at least one direction.

CITATION LIST

Patent Literature

Patent Literature 1: JP H08-48887 A
Patent Literature 2: JP H10-195302 A
Patent Literature 3: JP 2006-274073 A
Patent Literature 4: JP 2002-235011 A
Patent Literature 5: JP H09-87517 A
Patent Literature 6: WO 2012/005133
Patent Literature 7: JP 2002-146202 A
Patent Literature 8: JP 2004-137363 A
Patent Literature 9: WO 2003/044093
Patent Literature 10: JP H06-316686 A
Patent Literature 11: JP 2010-189599 A
Patent Literature 12: JP 2003-82123 A

SUMMARY OF INVENTION

Technical Problem

The present invention aims to provide a resin composition capable of providing a molded article which is excellent in flexibility, acid resistance, and electrical properties.

Solution to Problem

The present inventors have intensively studied to achieve a resin composition capable of providing a molded article which is excellent in flexibility, acid resistance, and electrical properties, and have focused on a resin composition including an aromatic polyether ketone resin and a fluororesin. Then, they have found that the use of a resin composition, in which a specific fluororesin is dispersed as particles in an aromatic polyether ketone resin, and the aromatic polyether ketone resin and the fluororesin satisfy a specific mass ratio, provides a molded article which has markedly enhanced flexibility, acid resistance, and electrical properties. Accordingly, they have completed the present invention.

That is, one aspect of the present invention is a resin composition including:
an aromatic polyether ketone resin (I); and
a fluororesin (II),
the fluororesin (II) being a copolymer of tetrafluoroethylene and a perfluoroethylenic unsaturated compound represented by the following formula (1):

$$CF_2=CF-Rf^1 \quad (1)$$

wherein $Rf^1$ represents $-CF_3$ or $-ORf^2$, and $Rf^2$ represents a $C_1$-$C_5$ perfluoroalkyl group,
the fluororesin (II) being dispersed as particles in the aromatic polyether ketone resin (I),
the resin composition satisfying a ratio (I):(II) by mass between the aromatic polyether ketone resin (I) and the fluororesin (II) of 50:50 to 10:90.

In the resin composition of the present invention, the fluororesin (II) in the aromatic polyether ketone resin (I) preferably has an average dispersed particle size of 10 μm or smaller.

In the resin composition of the present invention, the aromatic polyether ketone resin (I) and the fluororesin (II) preferably satisfy a melt viscosity ratio (I)/(II) of 0.01 to 1.0.

The fluororesin (II) preferably has a melt flow rate of 0 to 100 g/10 min.

The aromatic polyether ketone resin (I) is preferably a polyether ether ketone.

The resin composition of the present invention is preferably a kneaded product obtainable by melt-kneading the aromatic polyether ketone resin (I) and the fluororesin (II).

Another aspect of the present invention is a molded article including the above resin composition.

Still another aspect of the present invention is an insulated wire, including: a conductor (A); and an insulating layer (B) formed on a periphery of the conductor (A), the insulating layer (B) including the above molded article.

Advantageous Effects of Invention

Since the resin composition of the present invention has the above-mentioned structure, it can provide a molded article which is excellent in flexibility, acid resistance, and electrical properties.

DESCRIPTION OF EMBODIMENTS

The present invention is described in detail below.
The resin composition of the present invention includes an aromatic polyether ketone resin (I) and a fluororesin (II).
The aromatic polyether ketone resin (I) is preferably at least one selected from the group consisting of polyether ketone, polyether ether ketone, polyether ketone ketone, and polyether ketone ether ketone ketone. The aromatic polyether ketone resin (I) is more preferably at least one selected from the group consisting of polyether ketone and polyether ether ketone, still more preferably polyether ether ketone.

The aromatic polyether ketone resin (I) preferably has a melt viscosity of 0.10 to 1.50 $kNsm^{-2}$ at 60 $sec^{-1}$ and 390° C. A melt viscosity within the above range can enhance the processability, and furthermore, enables a molded article having a low coefficient of kinetic friction and high limit PV characteristics (high sliding properties). The upper limit of the melt viscosity is preferably 1.00 $kNsm^{-2}$.

The melt viscosity of the aromatic polyether ketone resin (I) is measured in conformity with ASTM D3835.

The aromatic polyether ketone resin (I) preferably has a glass transition temperature of 130° C. or higher. The glass transition temperature is more preferably 135° C. or higher, still more preferably 140° C. or higher. A glass transition temperature within the above range enables a resin composition having excellent heat resistance. The glass transition temperature is measured using a device for differential scanning calorimetry (DSC).

The aromatic polyether ketone resin (I) preferably has a melting point of 300° C. or higher. The melting point is more preferably 320° C. or higher. A melting point within the above range can enhance the heat resistance of the molded article to be obtained. The melting point is measured using a device for differential scanning calorimetry (DSC).

The fluororesin (II) is a copolymer of tetrafluoroethylene (TFE) and a perfluoroethylenic unsaturated compound represented by the following formula (1):

$$CF_2=CF-Rf^1 \quad (1)$$

wherein $Rf^1$ represents $-CF_3$ or $-ORf^2$, and $Rf^2$ represents a $C_1$-$C_5$ perfluoroalkyl group. The fluororesin (II) may be one fluororesin or two or more fluororesins. In the case that $Rf^1$ is $-ORf^2$, $Rf^2$ is preferably a $C_1$-$C_3$ perfluoroalkyl group. Use of the fluororesin (II) enables a molded article having both a low coefficient of kinetic friction and a high limiting PV value. For example, a polytetrafluoroethylene with no melt-processability fails to provide a molded article having sufficiently low abrasion characteristics.

The perfluoroethylenic unsaturated compound represented by the formula (1) is preferably at least one selected from the group consisting of hexafluoropropylene, perfluoro (methyl vinyl ether), perfluoro(ethyl vinyl ether), and perfluoro(propyl vinyl ether), more preferably at least one selected from the group consisting of hexafluoropropylene and perfluoro(propyl vinyl ether).

The fluororesin (II) is preferably a perfluoro polymer because it can provide a low coefficient of kinetic friction.

The fluororesin (II) preferably consists of 87 to 99 mol % of TFE and 1 to 13 mol % of the perfluoroethylenic unsaturated compound represented by the formula (1). It more preferably consists of 90 to 99 mol % of TFE and 1 to 10 mol % of the perfluoroethylenic unsaturated compound represented by the formula (1). It still more preferably consists of 93 to 99 mol % of TFE and 1 to 7 mol % of the perfluoroethylenic unsaturated compound represented by the formula (1).

The fluororesin (II) preferably has a melt viscosity of 0.1 to 5.0 $kNsm^{-2}$ at 60 $sec^{-1}$ and 390° C. A melt viscosity within this range can enhance the processability, and can achieve a low coefficient of kinetic friction and high limit PV characteristics. The lower limit of the melt viscosity is more preferably 0.2 $kNsm^{-2}$, still more preferably 0.5 $kNsm^{-2}$. The upper limit of the melt viscosity is more preferably 4.5 $kNsm^{-2}$, still more preferably 4.0 $kNsm^{-2}$.

The melt viscosity of the fluororesin (II) is measured in conformity with ASTM D3835.

The fluororesin (II) has a melt flow rate (MFR) of preferably 0 to 100 g/10 min, more preferably 0 to 40 g/10 min, still more preferably 0 to 30 g/10 min when measured at 372° C. under a load of 5000 g. An MFR within the above range can decrease the coefficient of kinetic friction of the molded article to be produced from the resin composition of the present invention, and also the limiting PV value can be enhanced. The lower limit of the MFR is still more preferably 0.1 g/10 min. The upper limit of the MFR is still more preferably 28 g/10 min, particularly preferably 10 g/10 min for reducing the coefficient of kinetic friction.

The fluororesin (II) may have any melting point, but preferably has a melting point equal to or lower than the melting point of the aromatic polyether ketone resin (I) because, in molding, the fluororesin (II) is preferred to be already melt at the temperature where the aromatic polyether ketone resin (I) used is molten. For example, the melting point of the fluororesin (II) is preferably 230° C. to 350° C.

The fluororesin (II) may have been treated with fluorine gas or ammonia by a known method.

The resin composition of the present invention satisfies a ratio (I):(II) by mass between the aromatic polyether ketone resin (I) and the fluororesin (II) of 50:50 to 10:90. The resin composition satisfying a ratio (I):(II) by mass in the above range enables production of a molded article which is excellent in flexibility, acid resistance, and electrical properties. If the fluororesin (II) content exceeds 90 in the mass ratio between the aromatic polyether ketone resin (I) and the fluororesin (II), the aromatic polyether ketone resin (I) becomes a dispersion layer, which tends to reduce the strength. If the fluororesin (II) content is less than 50, acid resistance is not achieved. The fluororesin (II) content preferably exceeds 50 in the mass ratio between the aromatic polyether ketone resin (I) and the fluororesin (II). The mass ratio is more preferably in the range of 45:55 to 20:80, still more preferably in the range of 40:60 to 30:70.

In the resin composition of the present invention, preferably the aromatic polyether ketone resin (I) and the fluororesin (II) satisfy a melt viscosity ratio (I)/(II) (aromatic polyether ketone resin (I)/fluororesin (II)) of 0.01 to 1.0. The melt viscosity ratio (I)/(II) within the above range can provide a molded article having a low coefficient of kinetic friction and high limit PV characteristics. Moreover, even a resin composition in which the fluororesin (II) content is larger than the aromatic polyether ketone resin (I) content, like the resin composition of the present invention, enables sufficiently efficient dispersion of the fluororesin (II) as particles in the aromatic polyether ketone resin (I). The melt viscosity ratio (I)/(II) is more preferably 0.01 to 0.50, still more preferably 0.01 to 0.20.

In particular, the melt viscosity ratio (I)/(II) is preferably 0.01 to 0.60 because such a ratio enables a film having less fish eyes, gives a better notched Izod strength, and can reduce the average dispersed particle size and the maximum dispersed particle size. Also, for better dispersion of the fluororesin (II) in the aromatic polyether ketone resin (I), the melt viscosity ratio (I)/(II) is preferably 0.01 to 0.60. The lower limit of the melt viscosity ratio (I)/(II) is more preferably 0.05.

The fluororesin (II) is dispersed in the aromatic polyether ketone resin (I) in the resin composition of the present invention. The resin composition with such an embodiment can provide a molded article having excellent impact resistance as well as a low coefficient of kinetic friction and high limit PV characteristics.

In the resin composition of the present invention, the fluororesin (II) dispersed as particles in the aromatic polyether ketone resin (I) preferably has an average dispersed particle size of 10 μm or smaller. An average dispersed particle size of the fluororesin (II) of 10 μm or smaller enables production of a molded article having both a low coefficient of kinetic friction and high limit PV characteristics. Too large average dispersed particle size leads to difficulty in production of a molded article as well as insufficient wear properties or wear resistance properties.

The average dispersed particle size of the fluororesin (II) is preferably 5 μm or smaller, still more preferably 2 μm or smaller, particularly preferably 1.5 μm or smaller because such a value can lead to a molded article having higher limit PV characteristics, and to better film formability.

The lower limit of the average dispersed particle size is not particularly limited, and may be 0.01 μm.

The average dispersed particle size of the fluororesin (II) can be measured by microscopically observing the resin composition of the present invention using a confocal laser microscope, and then binarizing the obtained image using an optical analysis device.

The resin composition of the present invention includes the aromatic polyether ketone resin (I) and the fluororesin (II), and may optionally further include additional components. Any additional components may be used, and examples thereof include fibrous reinforcing agents such as whiskers (e.g. potassium titanate whiskers), glass fibers, asbestos fibers, carbon fibers, ceramic fibers, potassium titanate fibers, aramid fibers, and other high-strength fibers; inorganic fillers such as calcium carbonate, talc, mica, clay, carbon powder, graphite, and glass beads; colorants; commonly used inorganic or organic fillers such as flame retardants; stabilizers such as minerals and flakes; lubricants such as silicone oil and molybdenum disulfide; pigments; conducting agents such as carbon black; impact resistance improvers such as rubber; and other additives.

The resin composition of the present invention may be produced in usual conditions using a mixer typically used for mixing a resin composition, such as a composition for molding. Examples of the mixer include mixing mills, Banbury mixers, pressure kneaders, and extruders. The mixer is preferably a twin-screw extruder because such a mixer is capable of reducing the average dispersed particle size of the fluororesin (II). The screw structure of a twin-screw extruder preferably satisfies L/D=35 or higher, more preferably L/D=40 or higher, particularly preferably L/D=45 or higher. The ratio L/D means a ratio of effective length of screw (L)/screw diameter (D).

Based on the above, the resin composition of the present invention is preferably one obtained by mixing an aromatic polyether ketone resin (I) and a fluororesin (II) using a twin-screw extruder having a ratio L/D of 35 or higher.

Examples of the method of producing the resin composition of the present invention include a method of mixing the aromatic polyether ketone resin (I) and the fluororesin (II) in a molten state.

Sufficient kneading of the aromatic polyether ketone resin (I) and the fluororesin (II) provides the resin composition of the present invention having a desired dispersion state. The dispersion state affects the flexibility, acid resistance, electrical properties, coefficient of kinetic friction and limit PV characteristics of the molded article, and formation of thin films and formability thereof. Thus, an appropriate mixing method needs to be selected in order to achieve the desired dispersion state in the molded article to be obtained from the resin composition.

Examples of the method of producing the resin composition of the present invention include a method in which the aromatic polyether ketone resin (I) and the fluororesin (II) are charged into a mixer at a proper ratio, the above additional components are optionally added, followed by melt-kneading at a temperature equal to or higher than the melting points of the resins (I) and (II).

As mentioned above, one preferable aspect of the present invention is that the resin composition of the present invention is a kneaded product obtainable by melt-kneading the aromatic polyether ketone resin (I) and the fluororesin (II).

The additional components may be mixed independently with the aromatic polyether ketone resin (I) and the fluororesin (II) before the kneading of the resins (I) and (II), or may be mixed with the aromatic polyether ketone resin (I) and the fluororesin (II) when these resins are mixed.

The melt-kneading temperature may be appropriately determined depending on the conditions such as the kinds of the aromatic polyether ketone resin (I) and the fluororesin (II) to be used. For example, the temperature is preferably 360° C. to 400° C. The kneading time is usually one minute to one hour.

The resin composition allows a molded article obtained therefrom to have a coefficient of kinetic friction of 0.22 or less. A coefficient of kinetic friction within the above range allows the resulting molded article to be suitably used as a sliding part. The coefficient of kinetic friction is more preferably 0.21 or less.

The resin composition allows a molded article obtained therefrom to have a limiting PV value of 800 or higher. The limiting PV value is more preferably 1000 or higher, still more preferably 1300 or higher, particularly preferably 1500 or higher.

The resin composition of the present invention allows a molded article formed from the resin composition to have a relative permittivity of 4.0 to 2.2. The molded article with such a relative permittivity has sufficiently favorable electrical properties. The molded article has a relative permittivity of more preferably 3.5 to 2.2, still more preferably 3.2 to 2.2. In order to obtain a molded article having the above relative permittivity, the resin composition needs to satisfy a ratio (I):(II) by mass between the aromatic polyether ketone resin (I) and the fluororesin (II) of 50:50 to 10:90.

A molded article formed from the resin composition of the present invention is another aspect of the present invention.

The molded article formed from the resin composition of the present invention has wear properties or wear resistance properties, impact resistance, heat resistance, chemical resistance, solvent resistance, strength, rigidity, low chemical permeability, dimensional stability, flame retardancy, and durability as well as flexibility, acid resistance, and electrical properties. In the electrical, electronic, and semiconductor fields, the molded article may be used for components of semiconductor- and liquid crystal device-manufacturing devices (e.g. CMP retainer rings, etching rings, silicon wafer carriers, and IC chip trays), insulating films, small button cells, cable connectors, and aluminum electrolytic condenser body casings. In the automobile field, the molded article may be used for thrust washers, oil filters, gears for auto air-conditioner controlling units, gears for throttle bodies, ABS parts, AT seal rings, MT shift fork pads, bearings, seals, and clutch rings. In the industrial field, the molded article may be used for compressor components, cables for mass transport systems, conveyor belt chains, connectors for oil field development machinery, pump components for hydraulic pressure driver systems (e.g. bearings, port plates, ball joints of pistons), gears, and piston sealing rings. In the aerospace field, the molded article may be used for cabin interior components and fuel pipe protecting materials in aircrafts. The molded article may also be used for other products such as food and beverage production equipment components, and medical instruments (e.g. sterile instruments, gas and liquid chromatographs).

The molded article may have any of various shapes, such as a sheet shape, film shape, rod shape, and pipe shape.

Another aspect of the present invention is a molded article for a sliding part obtained from the resin composition. A molded article for a sliding part which is formed from the above resin composition has a low coefficient of kinetic friction, and thus is suitable for use as a sliding part. Since the molded article includes a fluororesin, the molded article is also excellent in properties such as chemical resistance, weather resistance, non-adhesiveness, water repellence, and electrical properties.

Examples of the molded article for sliding parts include, but not particularly limited to, sealants, gears, actuators, pistons, bearings, bearing retainers, bushings, switches, belts, bearings, cams, rollers, and sockets.

The bearing is a component which is provided at a periphery of a shaft and is used in contact with the shaft, such as inner rings of rolling bearings or sliding bearings. It usually supports a rotatable or linearly movable shaft to retain the movement and the force acted thereon. The bearing may be used alone or in combination with other components. For the use in combination with other components, examples of the use include rolling bearings, such as ball bearings, roller bearings, radial bearings, and thrust bearings; sliding bearings, such as cylindrical bearing, non-circular bearings, and non-circular bearings; Oiles bearings; air bearings; and magnetic bearings.

The gear is usually attached to a rotatable shaft for power transfer. Examples of the gear include spur gears, helical gears, racks, internal gears, bevel gears, miter gears, screw gears, worm gears, drive gears, and idle gears.

The seal ring is usually attached to a rotatable shaft or a shaft movable in the shaft direction. For example, it is provided between a cylinder in a transmission or a piston and a shaft so as to seal oil. Such a seal ring can be used for various applications. For example, it can be used as a seal ring for transmissions of vehicles or for pistons in engines of vehicles, vessels, construction vehicles, industrial machines, or the like.

Any condition is applicable concerning a molding machine used in the method of producing the molded article. For example, common conditions may be employed. The molding temperature is preferably equal to or higher than the melting point of the aromatic polyether ketone resin (I) to be used. Also, the molding temperature is preferably below the lower one of the decomposition temperature of the fluororesin (II) and the decomposition temperature of the aromatic polyether ketone resin (I). The molding temperature may be, for example, 250° C. to 400° C.

The molded article of the present invention may be formed by a molding method commonly used for a thermoplastic resin composition, such as injection molding, extrusion molding, press molding, blow molding, calender molding, and casting molding, depending on the kind, use, and shape of the molded article to be obtained. The molded article may also be produced by a molding method which is a combination of the above molding methods. The molded article may be obtained through composite molding of the resin composition of the present invention and other polymers.

The molded article formed from the resin composition of the present invention is excellent in particular in the flexibility and electrical properties. Thus, if the molded article is used for an insulating layer of an insulated wire, the insulating layer not only has excellent insulating properties but also shows a low dielectric constant. Also, excellent handleability of the wire is achieved. Furthermore, the insulating layer is excellent in heat resistance, mechanical strength, tensile elongation, and crack resistance, and thus is not separated from a conductor even when the wire is used at high temperatures. Accordingly the molded article formed from the resin composition of the present invention can be suitably used as an insulating layer of an insulated wire.

That is, an insulated wire, including: a conductor (A); and an insulating layer (B) formed on a periphery of the conductor (A), the insulating layer (B) including the molded article of the present invention is still another aspect of the present invention.

The insulated wire of the present invention is also suitably used as a thin wire having a thin insulating layer (B).

In the insulated wire of the present invention, the insulating layer (B) formed on the periphery of the conductor (A) may contact with the conductor (A), or alternatively, another layer (e.g., another resin layer) may be disposed between the insulating layer (B) and the conductor (A). The insulating layer (B) preferably contacts with the conductor (A) because this structure can provide an insulated wire in which the conductor (A) is firmly attached to the insulating layer (B).

The insulating layer (B) has any film thickness. It has a film thickness of preferably 1 to 100 μm, more preferably 2 to 60 μm, still more preferably 3 to 40 μm. The film thickness may be reduced to 30 μm or less. A thinner insulating layer (B) advantageously achieves better radiation performance.

The insulating layer (B) is obtainable by forming the resin composition of the present invention on the periphery of the conductor (A). The insulated wire of the present invention can be produced by, for example, a production method including the steps of producing the resin composition of the present invention, and molding the resin composition of the present invention so that an insulating layer (B) is formed on the periphery of the conductor (A).

The insulating layer (B) may be formed in any method under conditions which are usually applied in formation of an insulating layer. The insulating layer (B) may be formed directly on the conductor (A) or may be formed on another resin layer formed therebetween.

The insulating layer (B) can be formed by melt-extruding the resin composition on the surface of the conductor (A) or on the surface of another resin layer previously formed on the conductor (A). It can also be formed by melt-extruding the resin composition to prepare a film, slitting the film into a predetermined size, and winding the film on the surface of the conductor (A) or on the surface of another resin layer previously formed on the conductor (A).

Usually, the temperature for forming the insulating layer (B) by melt-extrusion is preferably a temperature equal to or higher than the melting point of the aromatic polyether ketone resin (I). The molding temperature is more preferably below the lower one of the decomposition temperature of the fluororesin (II) and the decomposition temperature of the aromatic polyether ketone resin (I). The molding temperature may be, for example, 250° C. to 400° C., preferably 320° C. to 400° C.

The insulated wire of the present invention may be heated after formation of the insulating layer (B) at a temperature equal to or around the melting point of the fluororesin (II).

The insulated wire of the present invention includes the conductor (A) and the insulating layer (B) formed on the periphery of the conductor (A). It may also include another layer (e.g., another resin layer) between the conductor (A) and the insulating layer (B). Moreover, the insulated wire of the present invention may further include another layer (e.g., another resin layer) on the periphery of the insulating layer (B).

The another resin layer is different from the insulating layer (B). Preferable examples of such another layer include layers including at least one resin selected from the group consisting of aromatic polyether ketone resin, fluororesin, polyamide imide, polyether imide, polyether sulfone, and polyphenylene sulfide.

The material of the conductor (A) may be any material as long as it has good conductivity. Examples of the material include copper, copper alloy, copper-clad aluminum, aluminum, silver, gold, and zinc plated iron.

The conductor may have any shape including a circular shape or a flat shape. A circular conductor may have a diameter of 0.3 to 2.5 mm.

The insulated wire of the present invention can be suitably used as wrapped electric wires, wires for vehicles, wires for robots, or the like. It can also be suitably used as coil winding wires (magnet wires). The use of the insulated wire of the present invention suppresses damages during the wire winding process. The winding wire is suitable for motors, rotary electric machines, compressors, transformers, or the like, and has the properties sufficiently bearing the use in compact high-output motors which require dense wire winding as well as high voltage, high current, and high thermal conductivity. Furthermore, it is suitable as a wire for power supply, power transmission or telecommunications.

EXAMPLES

The present invention is described based on, but not limited to, the following examples.

<Measurement of MFR>

The mass (g/10 min) of the polymer flowing out from a nozzle (inner diameter: 2 mm, length: 8 mm) at 372° C. under a load of 5000 g was determined using a melt indexer (produced by Toyo Seiki Seisaku-sho, Ltd.) in conformity with ASTM D3307-01.

<Production of Pressed Sheet Molded Article>

The resin compositions produced in the examples and comparative examples each were compression molded in a heat press molding machine at 390° C. and 5 MPa, so that 1-mm-thick sheets were produced.

<Measurement of Relative Permittivity>

Aluminum was deposited in a vacuum on both surfaces of the pressed sheets prepared as above to provide measurement samples. The capacitance and dielectric tangent of each measurement sample were measured using an LCR meter (ZM 2353 produced by NF Corporation) at a frequency of 10 kHz in a dry air atmosphere at 25° C. The relative permittivity was calculated from the capacitance and the thickness of the pressed sheet.

<Evaluation of Acid Resistance>

A V-shaped dumbbell in accordance with ASTM was prepared from each of the pressed sheets prepared as above, and it was immersed in a 70% sulfuric acid (60° C.) for one week. After the immersion, a tensile test was performed to determine the elongation-retaining ratio (%) after the immersion by comparing the elongations before and after the immersion in acid. The acid resistance was evaluated based on the elongation-retaining ratio, i.e., a larger elongation-retaining ratio after the immersion in acid indicates higher acid resistance.

<Measurement of Melt Viscosity>

The melt viscosity of the aromatic polyether ketone resin was measured at 60 sec$^{-1}$ and 390° C. in conformity with ASTM D3835.

The melt viscosity of the fluororesin was measured at 60 sec$^{-1}$ and 390° C. in conformity with ASTM D3835.

<Measurement of Average Dispersed Particle Size>

The average dispersed particle size of the fluororesin was measured by microscopically observing the fluororesin using a confocal laser microscope, and then binarizing an obtained image using an optical analysis device.

The following materials were used in the examples and comparative examples.

Aromatic polyether ketone resin (1): Polyether ether ketone (melt viscosity: 1.19 kNsm$^{-2}$)

Aromatic polyether ketone resin (2): Polyether ether ketone (melt viscosity: 0.31 kNsm$^{-2}$)

Aromatic polyether ketone resin (3): Polyether ether ketone (melt viscosity: 0.20 kNsm$^{-2}$)

Fluororesin (1): Tetrafluoroethylene/hexafluoropropylene copolymer (compositional ratio by weight: tetrafluoroethylene/hexafluoropropylene/perfluoro(propyl vinyl ether)= 87.5/11.5/1.0, MFR: 23 g/10 min, melt viscosity: 0.55 kNsm$^{-2}$)

Fluororesin (2): Tetrafluoroethylene/hexafluoropropylene copolymer (compositional ratio by weight: tetrafluoroethylene/hexafluoropropylene=88.5/11.5, MFR: 6 g/10 min, melt viscosity: 2.23 kNsm$^{-2}$)

Fluororesin (3): Tetrafluoroethylene/hexafluoropropylene copolymer (compositional ratio by weight: 88.5/11.5, MFR: 1 g/10 min, melt viscosity: 3.22 kNsm$^{-2}$)

Fluororesin (4): Tetrafluoroethylene/perfluoro(alkyl vinyl ether) copolymer (compositional ratio by weight=94.5/5.5, MFR: 23 g/10 min, melt viscosity: 0.80 kNsm$^{-2}$)

Fluororesin (5): Tetrafluoroethylene/perfluoro(alkyl vinyl ether) copolymer (compositional ratio by weight=98.5/1.5, MFR: 2 g/10 min, melt viscosity: 2.32 kNsm$^{-2}$)

Fluororesin (6): Polytetrafluoroethylene (trade name: LUBRON L5, produced by Daikin Industries, Ltd.)

Example 1

The aromatic polyether ketone resin (2) and the fluororesin (2) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition. Observation of the resin composition using a confocal laser microscope confirmed that the fluororesin was dispersed as particles in the aromatic polyether ketone resin. Separately, a specimen (pressed sheet) was prepared from the resin composition by the above-mentioned method. The relative permittivity of the specimen was measured, and the acid resistance was evaluated. Table 1 shows the result.

Example 2

The aromatic polyether ketone resin (2) and the fluororesin (2) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition. Observation of the resin composition using a confocal laser microscope confirmed that the fluororesin was dispersed as particles in the aromatic polyether ketone resin. Separately, a specimen was prepared from the resin composition by the above-mentioned method. The relative permittivity of the specimen was measured, and the acid resistance was evaluated. Table 1 shows the result.

Example 3

The aromatic polyether ketone resin (2) and the fluororesin (3) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition. Observation of the resin composition using a confocal laser microscope confirmed that the fluororesin was dispersed as particles in the aromatic polyether ketone resin. Separately, a specimen was prepared from the resin composition by the above-mentioned method. The relative permittivity of the specimen was measured, and the acid resistance was evaluated. Table 1 shows the result.

Example 4

The aromatic polyether ketone resin (2) and the fluororesin (3) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition. Observation of the resin composition using a confocal laser microscope confirmed that the fluororesin was dispersed as particles in the aromatic polyether ketone resin. Separately, a specimen was prepared from the resin composition by the above-mentioned method. The relative permittivity of the specimen was measured, and the acid resistance was evaluated. Table 1 shows the result.

Example 5

The aromatic polyether ketone resin (3) and the fluororesin (2) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition. Observation of the resin composition using a confocal laser microscope confirmed that the fluororesin was dispersed as particles in the aromatic polyether ketone resin. Separately, a specimen was prepared from the resin composition by the above-mentioned method. The relative permittivity of the specimen was measured, and the acid resistance was evaluated. Table 1 shows the result.

Example 6

The aromatic polyether ketone resin (3) and the fluororesin (2) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition. Observation of the resin composition using a confocal laser microscope confirmed that the fluororesin was dispersed as particles in the aromatic polyether ketone resin. Separately, a specimen was prepared from the resin composition by the above-mentioned method. The relative permittivity of the specimen was measured, and the acid resistance was evaluated. Table 1 shows the result.

Example 7

The aromatic polyether ketone resin (3) and the fluororesin (3) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition. Observation of the resin composition using a confocal laser microscope confirmed that the fluororesin was dispersed as particles in the aromatic polyether ketone resin. Separately, a specimen was prepared from the resin composition by the above-mentioned method. The relative permittivity of the specimen was measured, and the acid resistance was evaluated. Table 1 shows the result.

Example 8

The aromatic polyether ketone resin (3) and the fluororesin (3) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition. Observation of the resin composition using a confocal laser microscope confirmed that the fluororesin was dispersed as particles in the aromatic polyether ketone resin. Separately, a specimen was prepared from the resin composition by the above-mentioned method. The relative permittivity of the specimen was measured, and the acid resistance was evaluated. Table 1 shows the result.

Example 9

The aromatic polyether ketone resin (2) and the fluororesin (5) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition. Observation of the resin composition using a confocal laser microscope confirmed that the fluororesin was dispersed as particles in the aromatic polyether ketone resin. Separately, a specimen was prepared from the resin composition by the above-mentioned method. The relative permittivity of the specimen was measured, and the acid resistance was evaluated. Table 1 shows the result.

Comparative Example 1

A specimen was prepared using the aromatic polyether ketone resin (1) alone in the above-mentioned method. The relative permittivity of the specimen was measured, and the acid resistance was evaluated. Table 1 shows the result.

Comparative Example 2

The aromatic polyether ketone resin (2) and the fluororesin (1) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition. A specimen was prepared from the resin composition by the above-mentioned method. The relative permittivity of the specimen was measured, and the acid resistance was evaluated. Table 1 shows the result.

Comparative Example 3

The aromatic polyether ketone resin (2) and the fluororesin (4) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition. A specimen was prepared from the resin composition by the above-mentioned method. The relative permittivity of the specimen was measured, and the acid resistance was evaluated. Table 1 shows the result.

Comparative Example 4

The aromatic polyether ketone resin (1) and the fluororesin (1) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition. A specimen was prepared from the resin composition by the above-mentioned method. The relative permittivity of the specimen was measured, and the acid resistance was evaluated. Table 1 shows the result.

Comparative Example 5

The aromatic polyether ketone resin (1) and the fluororesin (6) were preliminarily mixed at the ratio (parts by mass) shown in Table 1. Then, the mixture was melt-kneaded using a twin-screw extruder (φ5 mm, L/D=60) at a cylinder temperature of 390° C. and a screw rotation speed of 300 rpm, thereby producing a resin composition. Observation of the resin composition using a confocal laser microscope confirmed that the fluororesin was dispersed as particles in the aromatic polyether ketone resin. Separately, a specimen was prepared from the resin composition by the above-mentioned method and evaluated for the acid resistance. Table 1 shows the result.

TABLE 1

| | Melt viscosity (kNsm$^{-2}$) | Example 1 | Example 2 | Example 3 | Example 4 | Example 5 | Example 6 | Example 7 |
|---|---|---|---|---|---|---|---|---|
| Polyether ketone resin (1) | 1.19 | — | — | — | — | — | — | — |
| Polyether ketone resin (2) | 0.31 | 50 | 40 | 50 | 40 | — | — | — |
| Polyether ketone resin (3) | 0.20 | — | — | — | — | 50 | 40 | 50 |
| Fluororesin (1) | 0.55 | — | — | — | — | — | — | — |
| Fluororesin (2) | 2.23 | 50 | 60 | — | — | 50 | 60 | — |
| Fluororesin (3) | 3.22 | — | — | 50 | 60 | — | — | 50 |
| Fluororesin (4) | 0.80 | — | — | — | — | — | — | — |
| Fluororesin (5) | 2.32 | — | — | — | — | — | — | — |
| Fluororesin (6) | — | — | — | — | — | — | — | — |
| Rotation speed (rpm) | | 300 | 300 | 300 | 300 | 300 | 300 | 300 |
| Melt viscosity ratio (Polyether ketone resin/Fluororesin) | | 0.14 | 0.14 | 0.10 | 0.10 | 0.09 | 0.09 | 0.06 |
| Average dispersed particle size (μm) of fluororesin | | 0.68 | 0.88 | 1.46 | 1.48 | 1.32 | 1.02 | 3.21 |
| Relative permittivity | | 3.1 | 3.0 | 3.1 | 3.0 | 3.1 | 3.0 | 3.1 |
| Elongation-retaining ratio (%) after immersion in acid | | 91 | 95 | 92 | 96 | 93 | 95 | 92 |

| | Melt viscosity (kNsm$^{-2}$) | Example 8 | Example 9 | Comparative Example 1 | Comparative Example 2 | Comparative Example 3 | Comparative Example 4 | Comparative Example 5 |
|---|---|---|---|---|---|---|---|---|
| Polyether ketone resin (1) | 1.19 | — | — | 100 | — | — | 60 | 80 |
| Polyether ketone resin (2) | 0.31 | — | 50 | — | 80 | 80 | — | — |
| Polyether ketone resin (3) | 0.20 | 40 | — | — | — | — | — | — |
| Fluororesin (1) | 0.55 | — | — | — | 20 | — | 40 | — |
| Fluororesin (2) | 2.23 | — | — | — | — | — | — | — |
| Fluororesin (3) | 3.22 | 60 | — | — | — | — | — | — |
| Fluororesin (4) | 0.80 | — | — | — | — | 20 | — | — |
| Fluororesin (5) | 2.32 | — | 50 | — | — | — | — | — |
| Fluororesin (6) | — | — | — | — | — | — | — | 20 |
| Rotation speed (rpm) | | 300 | 300 | — | 300 | 300 | 300 | 300 |
| Melt viscosity ratio (Polyether ketone resin/Fluororesin) | | 0.06 | 0.13 | — | 0.56 | 0.39 | 2.16 | — |
| Average dispersed particle size (μm) of fluororesin | | 4.71 | 1.80 | — | 0.75 | 2.93 | 0.51 | 73 |
| Relative permittivity | | 3.0 | 3.1 | 4.0 | 3.6 | 3.7 | 3.5 | Unmeasurable |
| Elongation-retaining ratio (%) after immersion in acid | | 95 | 92 | 10 | 72 | 70 | 70 | 88 |

INDUSTRIAL APPLICABILITY

The resin composition of the present invention can provide a molded article which is excellent in flexibility, acid resistance, and electrical properties. The resin composition is suitable as a molding material for various industrial applications.

The invention claimed is:

1. A resin composition consisting of:
an aromatic polyether ketone resin (I); and
a fluororesin (II),
the fluororesin (II) being a copolymer of tetrafluoroethylene and a perfluoroethylenic unsaturated compound represented by the following formula (1):

$$CF_2=CF-Rf^1 \qquad (1)$$

wherein $Rf^1$ represents $-CF_3$ or $-ORf^2$, and $Rf^2$ represents a $C_1$-$C_5$ perfluoroalkyl group,
the fluororesin (II) being dispersed as particles in the aromatic polyether ketone resin (I),
the resin composition satisfying a ratio (I):(II) by mass between the aromatic polyether ketone resin (I) and the fluororesin (II) of 45:55 to 10:90,
wherein the aromatic polyether ketone resin (I) is a polyether ether ketone,
wherein the aromatic polyether ketone resin (I) has a melt viscosity of 0.10 to 1.50 kNsm$^{-2}$ at 60 sec$^{-1}$ and 390° C.,
wherein the fluororesin (II) comprises 90 to 99 mol % of tetrafluoroethylene and 1 to 10 mol % of the perfluoroethylenic unsaturated compound represented by formula (1),
wherein the perfluoroethylenic unsaturated compound is at least one selected from the group consisting of hexafluoropropylene, perfluoro(methyl vinyl ether), perfluoro(ethyl vinyl ether) and perfluoro(propyl vinyl ether),
wherein the fluororesin (II) has a melt viscosity of 0.1 to 5.0 kNsm$^{-2}$ at 60 sec$^{-1}$ and 390° C., and
wherein the aromatic polyether ketone resin (I) and the fluororesin (II) satisfy a melt viscosity ratio (I)/(II) of 0.01 to 0.2.

2. The resin composition according to claim 1,
wherein the fluororesin (II) in the aromatic polyether ketone resin (I) has an average dispersed particle size of 10 μm or smaller.

3. The resin composition according to claim 1,
wherein the fluororesin (II) has a melt flow rate of 0 to 100 g/10 min.

4. The resin composition according to claim 1,
wherein the resin composition is a kneaded product obtainable by melt-kneading the aromatic polyether ketone resin (I) and the fluororesin (II).

5. A molded article, comprising the resin composition according to claim 1.

6. An insulated wire, comprising:
a conductor (A); and
an insulating layer (B) formed on a periphery of the conductor (A),
the insulating layer (B) comprising the molded article according to claim 5.

\* \* \* \* \*